(No Model.) 2 Sheets—Sheet 1.

W. ZIEGER.
WHEEL.

No. 339,611. Patented Apr. 6, 1886.

Witnesses:
William D Conner
William T Davis

Inventor:
William Zieger
by his Attorneys
Howson and Sons (No Model.) 2 Sheets—Sheet 2.
W. ZIEGER.
WHEEL.
No. 339,611. Patented Apr. 6, 1886.
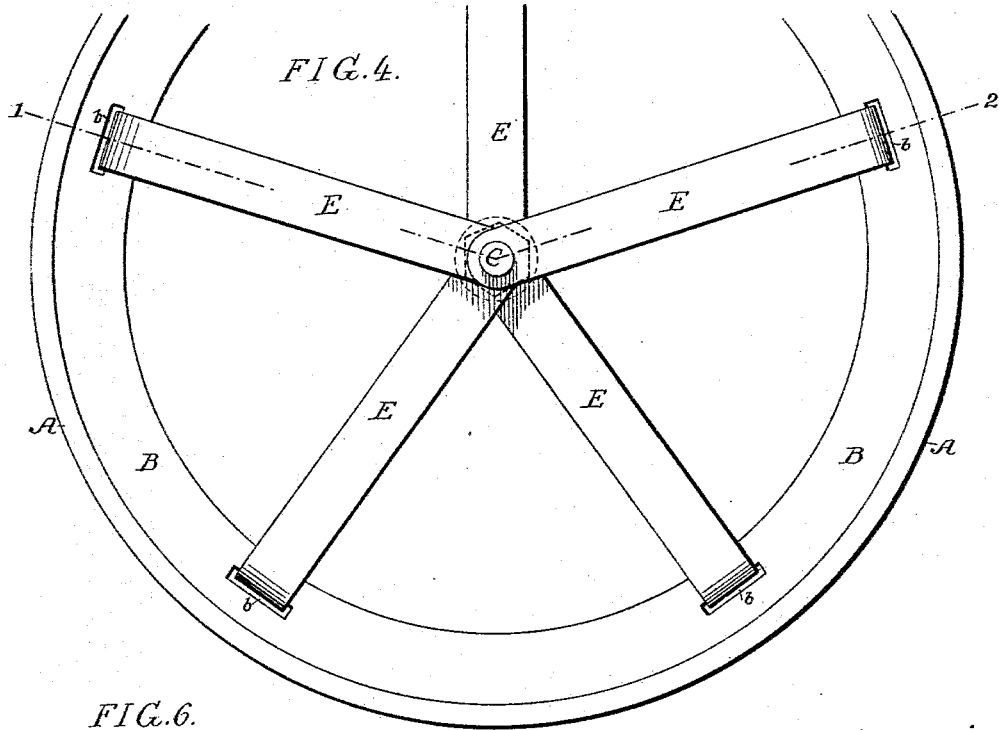
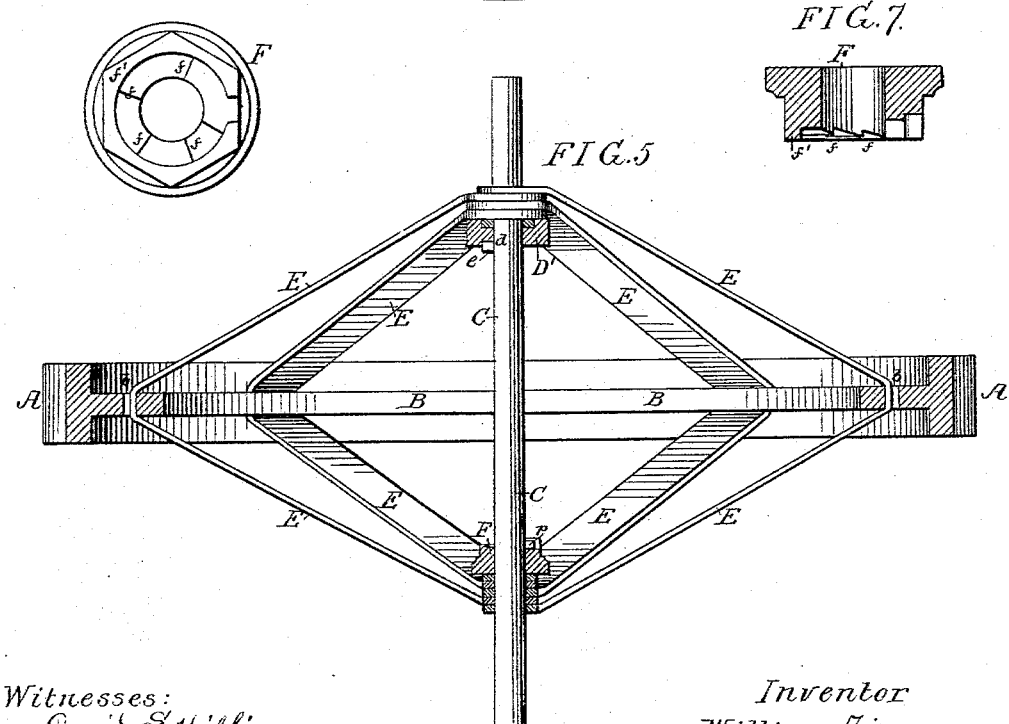
Witnesses:
David S. Williams
William I. Davis
Inventor
William Zieger
by his Attorneys
Howson and Son

UNITED STATES PATENT OFFICE.

WILLIAM ZIEGER, OF JENKINTOWN, PENNSYLVANIA, ASSIGNOR TO THE WILLIAMS TENSION WHEEL COMPANY, OF NEWARK, NEW JERSEY.

WHEEL.

SPECIFICATION forming part of Letters Patent No. 339,611, dated April 6, 1886.

Application filed January 27, 1886. Serial No. 189,976. (No model.)

*To all whom it may concern:*

Be it known that I, WILLIAM ZIEGER, a subject of the Emperor of Germany, residing in Jenkintown, Montgomery county, Pennsylvania, have invented a certain Improved Tension-Wheel, of which the following is a specification.

My invention consists of certain improvements in that class of wheels which are termed "tension-wheels"—that is, wheels in which the tension of the spokes may be adjusted—and the object of my invention is to provide such wheels with a simple and effective device for obtaining this adjustment.

Figure 1:
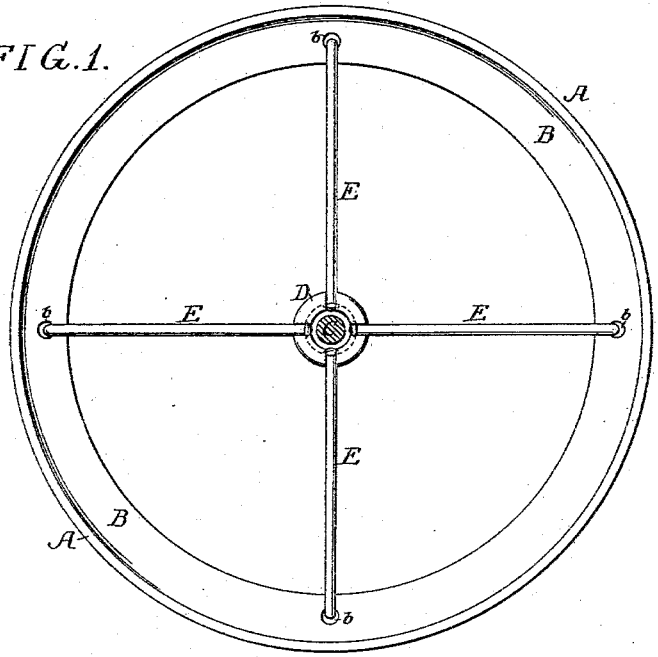
Figure 2:
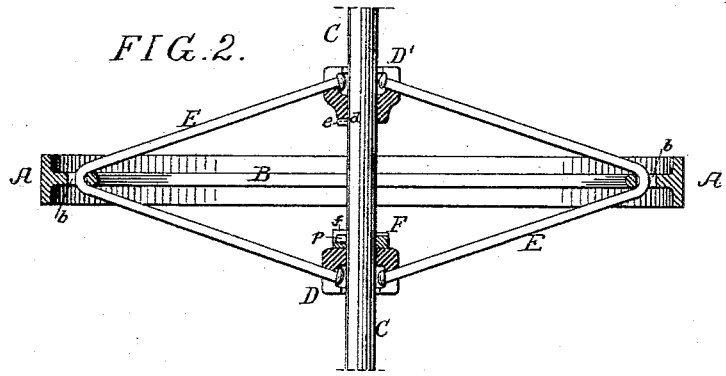
Figure 3:
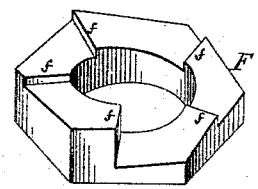

In the accompanying drawings, Figure 1 is a side view of a wheel to which my improvement may be applied. Fig. 2 is a sectional plan view of the same. Fig. 3 is a perspective view of the adjusting device, drawn to an enlarged scale. Fig. 4 is a side view of the main part of a modified form of wheel to which my invention may be applied. Fig. 5 is a sectional view of the same on the line 1 2, Fig. 4, and Figs. 6 and 7 are a face view and section, respectively, of a modified form of my improved tension device.

The form and construction of the tire, spokes, and axle may be varied greatly without departing from my invention, the essential feature of which consists in the device for adjusting the tension of the spokes. The spokes also may be either connected to hubs on the axle or axle-box of the wheel or may be connected directly to the axle.

In the construction shown in Figs. 1 and 2 I have illustrated a wheel in which the spokes are connected at their inner ends to hubs or half-hubs on the axle. In these figures, A is the tire or rim of the wheel, and B the felly, the two being shown as made in one piece, so as to form a combined tire and felly of T-section. Through openings b in this felly are passed the spokes E, which are headed at both ends, and their headed ends are connected to hubs or half-hubs D D' on the axle or axle-box C.

The manner of connecting the ends of the spokes to the hubs D D' forms no essential part of my present invention; but in the drawings I have illustrated the headed ends of the spokes as fitted into notches in the flanged rims of the hubs, as described in the patent granted to S. T. Williams, September 1, 1885, No. 325,301. In the present case the hub D' is connected to the axle or axle-box by means of a pin, e, in or on the axle adapted to a corresponding notch, d, in the hub; but the connection may be made in any other convenient way. The hub D is free to be adjusted longitudinally on the axle or axle-box C, and it bears against a nut, F, the construction of which is illustrated more fully in Fig. 3. One face of the nut which is to bear against the hub D is made smooth, while the other face is provided with a series of steps, f, of different heights, adapted to bear against and act in connection with a pin or projection, p, secured to or forming a part of the axle or axle-box C. The nut is free to turn upon the axle or axle-box, so that by adjusting the nut to bring a higher step f thereof to bear against the pin or projection p the distance between the hubs D D' will be correspondingly increased and the desired tension applied to the spokes.

In order to dispense with the use of a tool to separate the hubs D D' previous to the adjustment of the nut, I form the steps f of the nut with inclined faces, Fig. 3, so that by the simple turning of the nut in the proper direction, by means of a wrench or other tool, the projection p may be caused to rise onto a higher step to increase the tension of the spokes through the separation of the hubs, as will be readily understood.

In the modification illustrated in Figs. 4 and 5 a somewhat different construction of wheel is shown, with the ends of the spokes secured directly to the axle. In this case the spokes E are of flat metal, and are passed through slots in the felly B, which is similar to that illustrated in Figs. 1 and 2. The ends of the flat metal spokes have openings formed in them for the passage of the axle C, and one set of ends are held in position on the axle by means of a nut, D, which is fixed to the axle by a pin, e, adapted to a corresponding notch in the nut. Between the opposite ends of the spokes and a pin or projection, p, on the axle is interposed the stepped tensioning-nut F, which is similar to that described above, except that in this case I have shown it as provided with a protecting-flange, f'.

I wish it to be understood that I do not claim or limit myself to the constructions described and illustrated of tire, felly, spokes, axle or axle-box, as these may be varied, as I have said, without departing from my invention.

I claim as my invention—

1. A wheel having tension-spokes and an axle or axle-box provided with a pin or projection, and a tensioning device having steps of different heights, combined with said pin or projection, substantially as specified.

2. A wheel having tension-spokes and an axle or axle-box provided with a pin or projection, and a tensioning device having inclined steps of different heights, substantially as described.

3. The combination of the tension-spokes of a wheel, and hubs to which the spokes are connected, with an axle or axle-box, a pin or projection thereon, and a nut, F, having steps of different heights interposed between one of the hubs and the pin or projection, substantially as set forth.

In testimony whereof I have signed my name to this specification in the presence of two subscribing witnesses.

WILLIAM ZIEGER.

Witnesses:
WILLIAM D. CONNER,
HARRY SMITH.